US012051352B2

(12) United States Patent
Baek et al.

(10) Patent No.: US 12,051,352 B2
(45) Date of Patent: Jul. 30, 2024

(54) LIGHT EMITTING DISPLAY APPARATUS

(71) Applicant: LG Display Co., Ltd., Seoul (KR)

(72) Inventors: Lokdam Baek, Paju-si (KR); Jeongmin Park, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 25 days.

(21) Appl. No.: 17/982,278

(22) Filed: Nov. 7, 2022

(65) Prior Publication Data

US 2023/0215316 A1 Jul. 6, 2023

(30) Foreign Application Priority Data

Dec. 30, 2021 (KR) ...................... 10-2021- 0192166

(51) Int. Cl.
*G09G 3/20* (2006.01)

(52) U.S. Cl.
CPC ....... *G09G 3/20* (2013.01); *G09G 2300/0819* (2013.01); *G09G 2300/0842* (2013.01); *G09G 2310/021* (2013.01); *G09G 2310/061* (2013.01); *G09G 2310/08* (2013.01); *G09G 2320/043* (2013.01); *G09G 2330/027* (2013.01)

(58) Field of Classification Search
None
See application file for complete search history.

(56) References Cited

U.S. PATENT DOCUMENTS

| | | | | |
|---|---|---|---|---|
| 10,937,373 | B2 | 3/2021 | Baek | |
| 11,200,850 | B2 | 12/2021 | Choi | |
| 11,335,270 | B2 | 5/2022 | Baek | |
| 2017/0344179 | A1 | 11/2017 | Kim et al. | |
| 2019/0103049 | A1 | 4/2019 | Noh et al. | |
| 2021/0201770 | A1 * | 7/2021 | Park | G11C 19/28 |
| 2021/0201816 | A1 * | 7/2021 | Kim | G09G 3/3266 |
| 2021/0210019 | A1 * | 7/2021 | Han | G09G 3/3291 |

FOREIGN PATENT DOCUMENTS

| | | | |
|---|---|---|---|
| EP | 3 624 104 | A1 | 3/2020 |
| KR | 10-2020-0064617 | A | 6/2020 |
| KR | 10-2021-0085347 | A | 7/2021 |
| KR | 10-2021-0086294 | A | 7/2021 |

* cited by examiner

*Primary Examiner* — Ifedayo B Iluyomade
(74) *Attorney, Agent, or Firm* — Birch, Stewart, Kolasch & Birch, LLP

(57) ABSTRACT

A emitting display device can include a display panel including a plurality of pixels; a plurality of gate lines configured to supply gate signals to the pixels; and a plurality of stages connected to the plurality of gate lines, and configured to output gate pulses to a group of pixels connected to at least two gate lines among the plurality of gate lines for sensing a characteristic of each pixel among the group of pixels during a sensing period.

21 Claims, 6 Drawing Sheets

LIGHT EMITTING DISPLAY APPARATUS

CROSS-REFERENCE TO RELATED APPLICATIONS

This application claims the benefit of priority to the Korean Patent Application No. 10-2021-0192166 filed in the Republic of Korea on Dec. 30, 2021, the entirety of which is hereby expressly incorporated by reference into the present application.

BACKGROUND OF THE DISCLOSURE

Field of the Invention

The present disclosure relates to a light emitting display apparatus.

Discussion of the Related Art

Light emitting display apparatuses display an image by using a light emitting device. When a light emitting display apparatus is continuously used, a driving transistor for driving the light emitting device may be degraded, and thus, a threshold voltage of the driving transistor may vary, causing a degradation in the quality of an image.

In order to compensate for threshold voltage variations among transistors, various compensation methods are being used in a display period where an image is displayed.

Moreover, a light emitting display apparatus senses and stores threshold voltages of driving transistors included in all pixels before the display period starts after the light emitting display apparatus is turned on or before the light emitting display apparatus is turned off after the display period ends.

Light emitting display apparatuses may compensate for pieces of input image data in the display period by using threshold voltages stored therein. Therefore, even when threshold voltages of driving transistors vary, light emitting display apparatuses may display a normal image.

However, in the related art, after a sensing period starts, the time it takes for sensing pixels connected to each gate line can take a considerable amount of time. Due to this, a long period is needed for sensing all of the pixels included in the light emitting display apparatus, especially when the light emitting display apparatus has a large screen.

For example, when the light emitting display apparatus of the related art is turned off by a user, and then the user tries to quickly turn the light emitting display apparatus back on, a long lag time may be experienced by the user, since pixels are being sensed one gate line at a time in the sensing period when being powered down (e.g., while displaying a blank or black screen), which can lead to frustration (e.g., it can give the user the impression that the device is slow or getting hung up, when in reality, the device is just taking a long time to sense all of the pixels).

Further, since the related art devices can take a long time to sense all of the pixels, power consumption of the device may increase.

SUMMARY OF THE DISCLOSURE

Accordingly, the present disclosure is directed to providing a light emitting display apparatus that substantially obviates one or more issues due to limitations and disadvantages of the related art.

An aspect of the present disclosure is directed to providing a light emitting display apparatus which may sense pixels connected to at least two gate lines in a sensing period.

An aspect of the present disclosure is directed to providing a light emitting display device comprising a display panel including a plurality of pixels; a plurality of gate lines configured to supply gate signals to the pixels; and a plurality of stages connected to the plurality of gate lines, and configured to output gate pulses to a group of pixels connected to at least two gate lines among the plurality of gate lines for sensing a characteristic of each pixel among the group of pixels during a sensing period.

According to an aspect of the present disclosure, the sensing period is initiated after receiving a power OFF command for powering down the light emitting display device.

According to another aspect of the present disclosure, a first stage among the plurality of stages is configured to output the gate pulses to a first block of pixels connected to a first set of four or more gate lines for sensing a characteristic of each pixel in the first block of pixels during a first period of the sensing period, and a second stage among the plurality of stages is configured to output the gate pulses to a second block of pixels connected to a second set of four or more gate lines for sensing a characteristic of each pixel in the second block of pixels during a second period of the sensing period subsequent to the first period.

According to an aspect of the present disclosure, the plurality of stages include a first stage connected to a first gate line and a second gate line for supplying gate signals to a first group of pixels connected to the first gate line and the second gate line; and a second stage connected to a third gate line and a fourth gate line for supplying gate signals to a second group of pixels connected to the third gate line and the fourth gate line, in which the first stage is configured to output gate pulses to the first gate line and the second gate line for sensing a characteristic of each pixel among the first group of pixels during the sensing period, and the second stage is configured to output gate pulses to the third gate line and the fourth gate line for sensing a characteristic of each pixel among the second group of pixels during the sensing period.

According to another aspect of the present disclosure, the plurality of stages include a third stage connected to a fifth gate line and a sixth gate line for supplying gate signals to a third group of pixels connected to the fifth gate line and the sixth gate line, in which the third stage is configured to output gate pulses to the fifth gate line and the sixth gate line for sensing a characteristic of each pixel among the third group of pixels during the sensing period.

According to an aspect of the present disclosure, the at least two gate lines are connected to a same stage among the plurality of stages or at least two different stages.

According to yet another aspect of the present disclosure, each of the plurality of stages includes a signal output unit configured to sequentially output the gate pulses to the at least two gate lines; and a sensing selector configured to store a selection signal in a sensing selection period of the sensing period, and control the signal output unit to output the gate pulses during a sensing performance period of the sensing period based on the selection signal, the sensing performance period being subsequent to the sensing selection period.

According to an aspect of the present disclosure, the sensing selector includes a capacitor for storing the selection signal.

According to another aspect of the present disclosure, the sensing selector is configured to in response to receiving a first sensing control pulse during the sensing selection period of the first frame period while the selection signal is stored in the sensing selector, control the signal output unit to sequentially output the gate pulses to the at least two gate lines while a reset signal is received by the sensing selector during the sensing performance period of the sensing period.

According to an aspect of the present disclosure, a width of the reset signal is greater than a width of the first sensing control pulse, and the width of the first sensing control pulse is greater than a width of the selection signal.

According to another aspect of the present disclosure, the sensing selector of an $n^{th}$ stage, among the plurality of stages, is configured to receive a carry signal supplied from another stage among plurality of stages as the selection signal of the $n^{th}$ stage, n being a positive integer greater than zero.

According to another aspect of the present disclosure, an $n+1^{th}$ stage, among the plurality of stages, is configured to receive a different carry signal supplied from a different stage among plurality of stages as the selection signal of the $n+1^{th}$ stage, the different stage being different than the another stage.

According to an aspect of the present disclosure, the sensing selector in each of the plurality of stages further includes a selection signal transferor including a fourth transistor configured to transfer a carry signal from the carry output, the carry signal being received through the selection signal controller based on a carry control clock signal applied to a gate of the fourth transistor; and a reset unit including a fifth transistor having a gate connected to a gate of the third transistor of the selection signal controller, and a sixth transistor having a first terminal connected to the fifth transistor, a gate configured to be supplied with a reset signal, and a second terminal connected to a Q node of the corresponding stage.

According to another aspect of the present disclosure, the sensing selector in each of the plurality of stages further includes a selection signal storage unit connected between the selection signal controller and the reset unit, the selection signal storage unit including a capacitor.

According to an aspect of the present disclosure, the sensing selector in each of the plurality of stages further includes an initialization unit including a seventh transistor including a first terminal connected to the sixth transistor, and a second terminal connected to a Qb node of the corresponding stage; and an eight transistor including a first terminal connected to the second terminal of the seventh transistor, in which a gate of the seventh transistor is connected to a gate of the sixth transistor and configured to be supplied with an initialization voltage.

According to another aspect of the present disclosure, the initialization unit is configured to in response to receiving the initialization voltage, prevent the signal output unit from outputting the gate pulses to the at least two gate lines.

According to an aspect of the present disclosure, the sensing selector in each of the plurality of stages includes a selection signal controller including a first transistor including a first terminal connected to a carry output of another stage among the plurality of stages; a second transistor including a first terminal connected to a second terminal of the first transistor; and a third transistor connected between the second terminal of the first transistor and the first terminal of the second transistor, in which a first gate of the first transistor is connected to a second gate of the second transistor, and the first and second gates are connected to a sensing control signal line configured to be supplied with the first sensing control pulse.

According to another aspect of the present disclosure, the first and second gates in the selection signal controller of an $n^{th}$ stage, among the plurality of stages, and the first and second gates in the selection signal controller of an $n+1^{th}$ stage, among the plurality of stages, are all connected to the sensing control signal line, n being a positive integer greater than zero.

According to an aspect of the present disclosure, the first terminal of the first transistor in the selection signal controller of the $n^{th}$ stage and the first terminal of the first transistor in the selection signal controller of the $n+1^{th}$ stage are connected to carry outputs from two different stages among the plurality of stages.

Additional advantages and features of the disclosure will be set forth in part the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided a light emitting display apparatus including a light emitting display panel including gate lines, a gate driver supplying gate signals to the gate lines, and a controller controlling the gate driver, in which the gate driver includes a plurality of stages, each of the plurality of stages includes a signal output unit sequentially outputting gate pulses to at least two gate lines, a signal controller controlling the signal output unit, and a sensing selector storing a selection signal in a sensing selection period and controlling the signal output unit by using the selection signal in a sensing, and the selection signal is stored in the sensing selectors included in at least two stages in the sensing period.

It is to be understood that both the foregoing general description and the following detailed description of the present disclosure are explanatory and are intended to provide further examples and explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain principles of the disclosure. In the drawings.

DETAILED DESCRIPTION OF THE EMBODIMENTS

Figure 1:
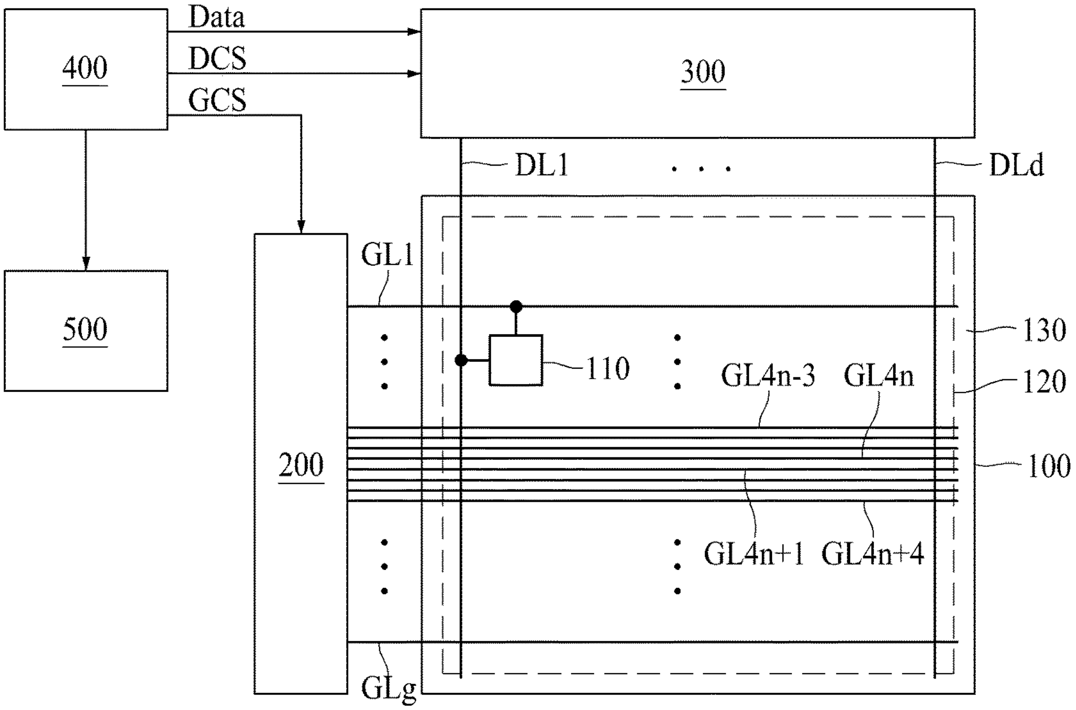
FIG. 1 is an example diagram illustrating a configuration of a light emitting display apparatus according to an embodiment of the present disclosure.

Reference will now be made in detail to the embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. When "comprise," "have," and "include" described in the present specification are used, another part may be added unless "only" is used. The terms of a singular form may include plural forms unless referred to the contrary.

In construing an element, the element is construed as including an error or tolerance range although there is no explicit description of such an error or tolerance range.

In describing a position relationship, for example, when a position relation between two parts is described as, for example, "on," "over," "under," and "next," one or more other parts may be disposed between the two parts unless a more limiting term, such as "just" or "direct(ly)" is used.

In describing a time relationship, for example, when the temporal order is described as, for example, "after," "subsequent," "next," and "before," a situation that is not continuous may be included unless a more limiting term, such as "just," "immediate(ly)," or "direct(ly)" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," "A," "B," "(a)," "(b)," etc. may be used. These terms are intended to identify the corresponding elements from the other elements, and basis, order, or number of the corresponding elements should not be limited by these terms. The expression that an element is "connected," "coupled," or "adhered" to another element or layer, the element or layer can not only be directly connected or adhered to another element or layer, but also be indirectly connected or adhered to another element or layer with one or more intervening elements or layers "disposed," or "interposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, embodiments of the present disclosure will be described in detail with reference to the accompanying drawings.

Figure 2:
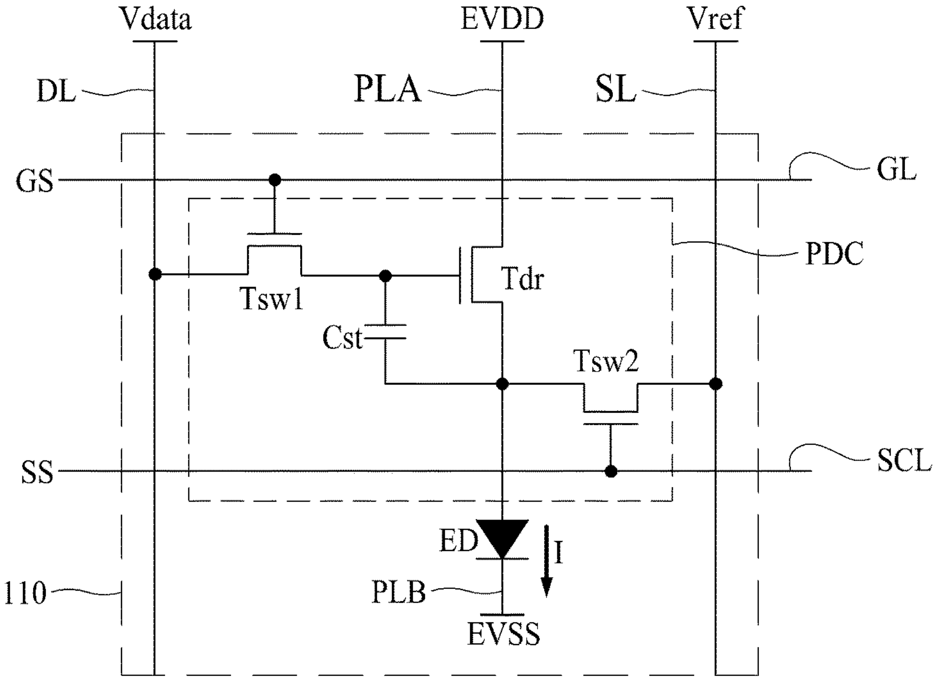
FIG. 2 is an example diagram illustrating a structure of a pixel applied to a light emitting display apparatus according to an embodiment of the present disclosure.
Figure 3:
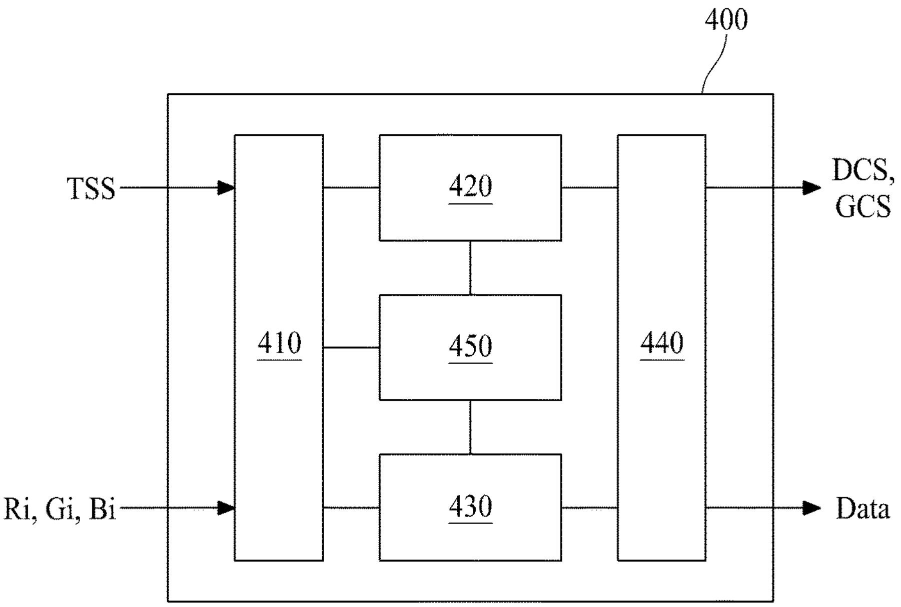
FIG. 3 is an example diagram illustrating a configuration of a controller applied to a light emitting display apparatus according to an embodiment of the present disclosure.
Figure 4:
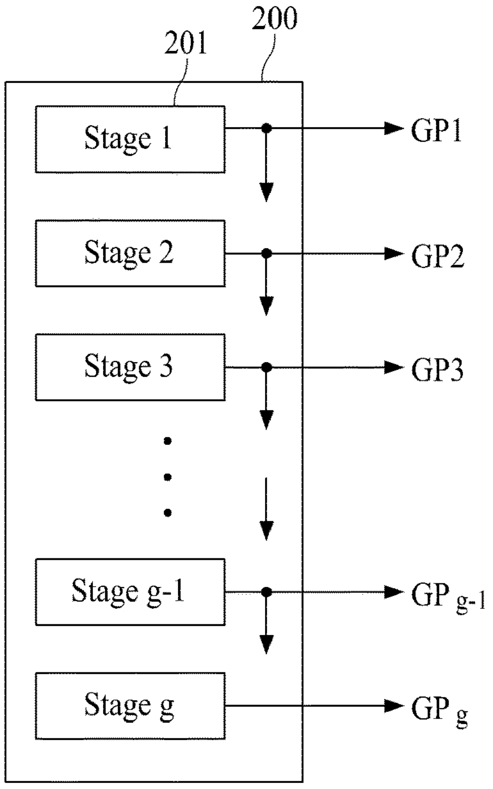
FIG. 4 is an example diagram illustrating a configuration of a gate driver applied to a light emitting display apparatus according to an embodiment of the present disclosure.

FIG. 1 is an example diagram illustrating a configuration of a light emitting display apparatus according to an embodiment of the present disclosure. FIG. 2 is an example diagram illustrating a structure of a pixel applied to a light emitting display apparatus according to an embodiment of the present disclosure. FIG. 3 is an example diagram illustrating a configuration of a controller applied to a light emitting display apparatus according to an embodiment of the present disclosure. FIG. 4 is an example diagram illustrating a configuration of a gate driver applied to a light emitting display apparatus according to an embodiment of the present disclosure.

The light emitting display apparatus according to the present disclosure can configure various electronic devices. The electronic devices can include, for example, smartphones or other smart devices, tablet personal computers (PCs), televisions (TVs), navigation devices, wearable smart devices, and monitors.

The light emitting display apparatus according to the present disclosure, as illustrated in FIG. 1, can include a light emitting display panel 100 which includes a display area 120 displaying an image and a non-display area 130 provided outside the display area 120, a gate driver 200 which supplies a gate signal to a plurality of gate lines GL1 to GLg provided in the display area 120 of the light emitting display panel 100, a data driver 300 which supplies data voltages to a plurality of data lines DL1 to DLd provided in the light emitting display panel 100, a controller 400 which controls driving of the gate driver 200 and the data driver 300, and a power supply 500 which supplies power to the controller, the gate driver, the data driver, and the light emitting display panel. Here, g, d and n can be positive integers greater than zero.

First, the light emitting display panel 100 can include a display area 120 and a non-display area 130. The gate lines GL1 to GLg, the data lines DL1 to DLd, and a plurality of pixels 110 can be provided in the display area 120. Accordingly, the display area 120 can display an image. Here, g and d can each be a natural number. The non-display area 130 can surround an outer portion of the display area 120.

Each pixel 110 included in the light emitting display panel 100, as illustrated in FIG. 2, can include an emission area which includes a pixel driving circuit PDC, including a switching transistor Tsw1, a storage capacitor Cst, a driving transistor Tdr, and a sensing transistor Tsw2, and a light emitting device ED.

A first terminal of the driving transistor Tdr can be connected to a high voltage supply line PLA through which a high voltage EVDD is supplied, and a second terminal of the driving transistor Tdr can be connected to the light emitting device ED.

A first terminal of the switching transistor Tsw1 can be connected to a data line DL, a second terminal of the switching transistor Tsw1 can be connected to a gate of the driving transistor Tdr, and a gate of the switching transistor Tsw1 can be connected to a gate line GL.

A data voltage Vdata can be supplied to the data line DL, and a gate signal GS can be supplied to the gate line GL.

The sensing transistor Tsw2 can be provided for measuring a threshold voltage or mobility of the driving transistor Tdr. A first terminal of the sensing transistor Tsw2 can be connected to a second terminal of the driving transistor Tdr and the light emitting device ED, a second terminal of the sensing transistor Tsw2 can be connected to a sensing line SL through which a reference voltage Vref is supplied, and a gate of the sensing transistor Tsw2 can be connected to a sensing control line SCL through which a sensing control signal SS is supplied.

The sensing line SL can be connected to the data driver 300, or can be connected to the power supply 500 through the data driver 300. That is, the reference voltage Vref supplied from the power supply 500 can be supplied to pixels through the sensing line SL, and sensing signals transferred through the sensing line SL from the pixels can be processed by the data driver 300.

A structure of the pixel 110 applied to the present disclosure is not limited to a structure illustrated in FIG. 2. Accordingly, a structure of the pixel 110 can be changed to various configurations.

Hereinafter, however, for convenience of description, a light emitting display apparatus including the pixel illustrated in FIG. 2 will be described as an example of the present disclosure.

With reference to FIG. 3, the controller 400 can realign input video data Ri, Gi, and Bi transferred from an external system by using a timing synchronization signal TSS transferred from the external system and can generate data control signals DCS which are to be supplied to the data driver 300 and gate control signals GCS which are to be supplied to the gate driver 200.

To this end, as illustrated in FIG. 3, the controller 400 can include a data aligner 430 which realigns the input video data Ri, Gi, and Bi to generate image data and supplies the image data to the data driver 300, a control signal generator 420 which generates the gate control signal GCS and the data control signal DCS by using the timing synchronization signal TSS, an input unit 410 which receives the timing synchronization signal and the input video data Ri, Gi, and Bi transferred from the external system and respectively transfers the timing synchronization signal and the input video data to the data aligner and the control signal generator, and an output unit 440 which supplies the data driver 300 with the image data generated by the data aligner and the data control signal DCS generated by the control signal generator and supplies the gate driver 200 with the gate control signal GCS generated by the control signal generator. The controller 400 can include a storage unit 450 for storing various information.

The external system can perform a function of driving the controller 400 and an electronic device. For example, when the electronic device is a TV, the external system can receive various sound information, video information, and letter information over a communication network and can transfer the received video information to the controller 400. In this situation, the image information can include input video information.

The power supply 500 can generate various powers and can supply the generated powers to the controller 400, the gate driver 200, the data driver 300, and the light emitting display panel 100.

The data driver 300 can be provided on a chip on film (COF) attached on the light emitting display panel 100, or can be directly equipped in the light emitting display panel 100.

The data driver 300 can supply data voltages Vdata to the data lines DL1 to DLd in a display period where an image is displayed.

The data driver 300 can convert a sensing signal, received through the sensing line SL, into digital sensing data and can transfer the sensing data to the controller 400 in a sensing period. The sensing signal can be a signal associated with a characteristic of the driving transistor Tdr, or can be a signal associated with a characteristic of the light emitting device ED.

That is, in the sensing period, a threshold voltage of the driving transistor Tdr, the mobility of the driving transistor Tdr, or a current flowing in the light emitting device ED can be sensed.

Here, the sensing period can be a period until a display period starts, after the light emitting display apparatus is turned on, or can be a period until the light emitting display apparatus is turned off, after the display period ends.

The light emitting display apparatus being turned on can denote that power is supplied to the controller 400, the gate driver 200, the data driver 300, and the power supply 500 configuring the light emitting display apparatus, and thus, the controller 400, the gate driver 200, the data driver 300, and the power supply 500 are driven. When the controller 400, the gate driver 200, the data driver 300, and the power supply 500 are normally driven as the light emitting display apparatus is turned on, the display period can start, and thus, an image can be displayed by the light emitting display panel 100.

The light emitting display apparatus being turned off can denote that only a minimum of power is supplied to the light emitting display apparatus. For example, when the light emitting display apparatus is turned off, power can be supplied to only the controller 400 through the power supply 500, and thus, only a minimum function of the light emitting display apparatus can be performed.

As described above, the sensing period can be a period until the display period starts from after the light emitting display apparatus is turned on, or can be a period until the light emitting display apparatus is turned off from after the display period ends.

Hereinafter, for convenience of description, a light emitting display apparatus where the sensing period is a period until the light emitting display apparatus is turned off, starting from after the display period ends, will be described as an example of the present disclosure.

That is, in executing the display period where an image is displayed, when a user powers off an electronic device (e.g., by pressing the power button on the electronic device or on a remote), the light emitting display apparatus can stop an operation of displaying an image and can perform a sensing operation. When the sensing operation is completed, the light emitting display apparatus can be fully turned off. Here, a period where the sensing operation is performed can be a sensing period.

Finally, the gate driver 200 can be configured as an integrated circuit (IC) and can be mounted in the non-display area 130. Also, the gate driver 200 can be directly embedded in the non-display area 130 by using a gate in panel (GIP) type. In a situation which uses the GIP type, transistors configuring the gate driver 200 can be implemented in the non-display area through the same process as transistors included in each of the pixels 110.

The gate driver 200 can supply gate pulses GP1 to GPg to the gate lines GL1 to GLg.

When the gate pulse generated by the gate driver 200 is supplied to the gate of the switching transistor Tsw1 included in the pixel 110, the switching transistor Tsw1 can be turned on. When the switching transistor Tsw1 is turned on, a data voltage supplied through a data line can be supplied to the pixel 110.

When a gate-off signal generated by the gate driver 200 is supplied to the switching transistor Tsw1, the switching transistor Tsw1 can be turned off. When the switching transistor Tsw1 is turned off, a data voltage may not be supplied to the pixel 109.

The gate signal GS supplied to the gate line GL can include the gate pulse and a gate off signal.

To this end, as illustrated in FIG. 4, The gate driver 200 can include a plurality of stages 201 (e.g., stages 1 through g, where g is a positive integer greater than zero).

Each of the stages 201 can be connected to at least one gate line GL. Each of the stages 201 can be driven based on a start signal transferred from the controller 400, or can be driven based on a carry signal transferred from a previous stage or a next stage.

Here, a previous stage can denote a stage which is driven prior to a currently driven stage and outputs a gate pulse. In this situation, the previous stage can be adjacent to the currently driven stage, or at least one other stage can be provided between the previous stage and the currently driven stage.

Moreover, the next stage can denote a stage which is driven later than the currently driven stage and outputs the gate pulse. In this situation, the next stage can be adjacent to the currently driven stage, or at least one other stage can be provided between the next stage and the currently driven stage.

Each of the stages 201 can include at least two transistors and can be configured as various types.

Hereinafter, a configuration and a function of each of the stages 201 will be described with reference to FIGS. 5 to 8.

Figure 5:
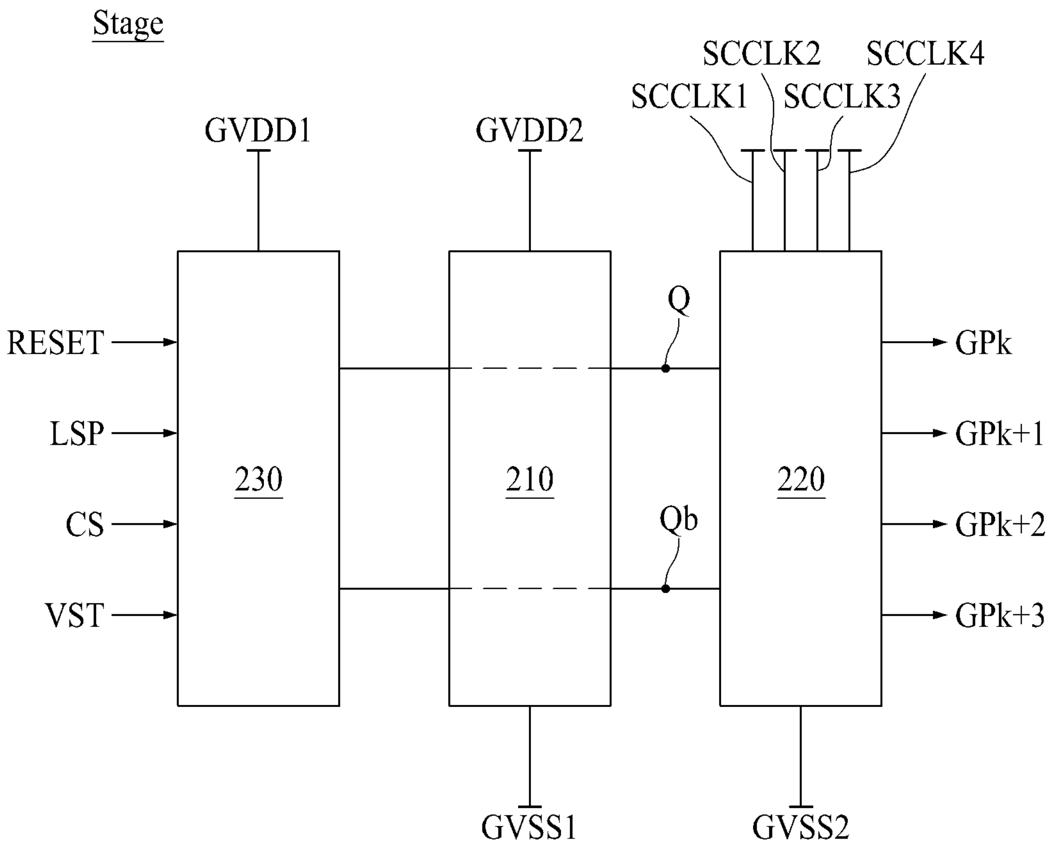
FIG. 5 is an example diagram schematically illustrating a configuration of one stage in a gate driver applied to a light emitting display apparatus according to an embodiment of the present disclosure.

FIG. 5 is an example diagram schematically illustrating a configuration of a stage applied to a light emitting display apparatus according to an embodiment of the present disclosure.

As described above, the gate driver 200 can include a plurality of stages 201, and each of the stages 201 can be connected to at least one gate line GL.

Hereinafter, the stage 201 connected to at least two gate lines will be described as an example embodiment of the present disclosure, and in more detail, the stage 201 connected to four gate lines will be described as an example of the present disclosure.

In this situation, as illustrated in FIG. 5, each of the stages can include a signal output unit 220 which sequentially outputs a gate pulse to at least two gate lines, a signal controller 210 which controls the signal output unit 220, and a sensing selector 230 which stores a selection signal in a sensing selection period and controls the signal output unit 220 by using the selection signal in a sensing period.

First, the signal output unit 220 can sequentially output a gate pulse to at least two gate lines.

For example, as illustrated in FIG. 5, the signal output unit 220 can output gate pulses GPk, GPk+1, GPk+2, and GPk+3 (where k is a natural number which is less than g) to four gate lines.

To this end, four gate clocks SCCLK1 to SCCLK4 having different phases can be supplied to the signal output unit 220. Four gate pulses GPk, GPk+1, GPk+2, and GPk+3 can be output based on the four gate clocks SCCLK1 to SCCLK4.

The four gate pulses GPk, GPk+1, GPk+2, and GPk+3 can be sequentially supplied to four gate lines, respectively.

The signal output unit 220 can output a gate off signal to gate lines to which the gate pulse is not output.

To this end, the signal output unit 220 can include transistors.

Second, the signal controller 210 can perform a function of controlling the signal output unit 220.

Figure 6:
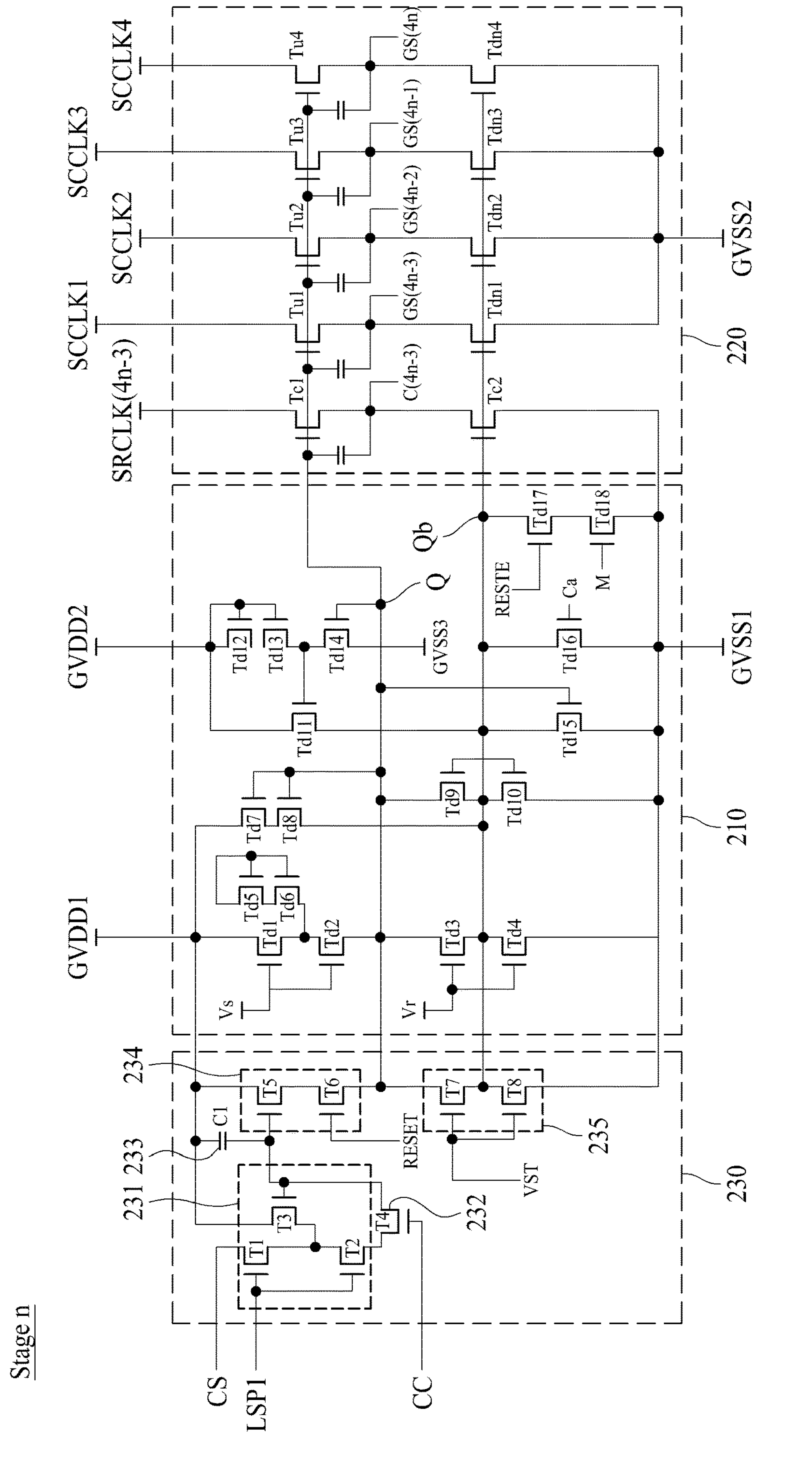
FIG. 6 is an example diagram illustrating in detail a configuration of one stage in a gate driver applied to a light emitting display apparatus according to an embodiment of the present disclosure.

That is, the signal controller 210 can control a signal supplied to a Q node and a signal supplied to a Qb node, and thus, the signal output unit 220 can output the gate pulse or the gate off signal (e.g., see FIGS. 5 and 6).

The signal controller 210 can be driven based on the start signal transferred from the controller 400 or the carry signal transferred from a previous state or a next stage and can transfer a Q node control signal to the Q node Q.

The signal output unit 220 can sequentially output at least two gate pulses based on the Q node control signal.

The signal controller 210 can be driven based on the carry signal transferred to the previous stage or the next stage and can transfer a Qb node control signal to the Qb node Qb.

The signal output unit 220 can output the gate off signal to the gate lines based on the Qb node control signal. According to an embodiment of the present invention, the Qb node can be effectively be pre-charged or can be ready faster, and sensing of the pixels connected to each of the gate lines can be carried out faster during the OFF sensing, thus, improving a user experience and reducing power consumption.

A structure of the signal controller 210 can be used for configuring the gate driver, or one of various structures understood by those skilled in the art can be applied.

That is, the signal controller 210 can be variously configured to have various structures and functions understood by those skilled in the art.

Third, the sensing selector 230 can store the selection signal in the sensing selection period and can control the signal output unit 220 by using the selection signal in the sensing period.

Particularly, in the present disclosure, the selection signal can be stored in the sensing selectors 230 included in at least two stages in the sensing selection period.

Therefore, in the sensing period, pixels connected to gate lines connected to at least two stages can be sensed (e.g., pixels connected to more than one gate line can be sensed during the same sensing period).

The sensing selector 230 can store, as the selection signal, a selection carry signal CS supplied from the previous stage or the next stage. Particularly, when a sensing control pulse configuring a sensing control signal LSP is transferred to the sensing selector 230, the selection carry signal CS can be stored in the sensing selector 230.

The sensing selector 230 can be initialized based on the selection carry signal CS supplied from the previous stage or the next stage. When the sensing selector 230 is initialized, the selection signal stored in the sensing selector 230 can be deleted.

When a reset pulse configuring a reset signal RESET is transferred to the sensing selector 230, the sensing selector 230 can supply the selection signal to the signal output unit 220 through the Q node Q. Accordingly, the gate pulses can be sequentially output from the signal output unit 220.

When an initialization voltage VST is input after the reset pulse is supplied, the gate pulses may not be output from the signal output unit 220.

FIG. 6 is an example diagram illustrating in detail a configuration of a stage applied to a light emitting display apparatus according to an embodiment of the present disclosure. That is, FIG. 6 illustrates a detailed example of the stage described above with reference to FIG. 5, and particularly, illustrates an $n^{th}$ stage (Stage n). In the following description, a stage 201 connected to four gate lines will be described as an example of the present disclosure. Therefore, the following description can be applied to a stage 201 connected to two gate lines, a stage connected to three gate lines, and a stage connected to five or more gate lines. For example, each of the sensing selector 230, the signal controller 210, and the signal output unit 220 can correspond to a different circuit portion of the circuit shown in FIG. 6.

First, the signal output unit 220 can output gate pulses and gate off signals to four gate lines. That is, the signal output unit 220 can output gate signals GS(4n−3)), GS(4n−2), GS(4n−1), and GS(4n) to the four gate lines.

In this situation, as illustrated in FIG. 1, the four gate lines can include $4n-3^{th}$ to $4n^{th}$ gate lines GL4$n$−3 to GL4$n$, where n is a positive integer greater than zero.

In order to output four gate pulses, the signal output unit 220 can include four pull-up transistors Tu1 to Tu4.

Gates of the four pull-up transistors Tu1 to Tu4 can be connected to a signal controller 210 through a Q node Q.

First terminals of the four pull-up transistors Tu1 to Tu4 can be respectively connected to lines through which first to fourth gate clocks SCCLK1 to SCCLK4 are supplied.

The first to fourth gate clocks SCCLK1 to SCCLK4 can have different phases. Four gate pulses can be sequentially output based on the first to fourth gate clocks SCCLK1 to SCCLK4.

Second terminals of the four pull-up transistors Tu1 to Tu4 can be respectively connected to the $4n-3^{th}$ to $4n^{th}$ gate lines GL4$n$−3 to GL4$n$.

The signal output unit 220 can include a first carry output transistor Tc1 for outputting the carry signal C. The carry signal C output from the $n^{th}$ stage (Stage n) can be supplied to the previous stage and the next stage. The signal controller 210 of the previous stage and the next stage can be driven by the carry signal C, or the sensing selector 230 can be driven.

As described above, the previous stage can be an $n-1^{th}$ stage adjacent to the $n^{th}$ stage (Stage n), or can be one of stages apart from the $n^{th}$ stage (Stage n). Also, the next stage can be an $n+1^{th}$ stage adjacent to the $n^{th}$ stage (Stage n), or can be one of the stages apart from the $n^{th}$ stage (Stage n).

A gate of the first carry output transistor Tc1 can be connected to a Q node Q, a first terminal of the first carry output transistor Tc1 can be connected to a line through which a $4n-3^{th}$ carry clock SRCLK(4n−3) is input, and a second terminal of the first carry output transistor Tc1 can be connected to a carry output line. The carry output line, as described above, can be connected to the previous stage and the next stage.

In order to output gate off signals to four gate lines, the signal output unit 220 can include four pull-down transistors Tdn1 to Tdn4.

Gates of the four pull-down transistors Tdn1 to Tdn4 can be connected to the signal controller 210 through a Qb node Qb.

First terminals of the four pull-down transistors Tdn1 to Tdn4 can be respectively connected to the $4n-3^{th}$ to $4n^{th}$ gate lines GL4$n$−3 to GL4$n$.

Second terminals of the four pull-down transistors Tdn1 to Tdn4 can be respectively connected to a line through which a gate off voltage GVSS2 to be used as a gate off signal is supplied.

A gate of the second carry output transistor Tc2 can be connected to the Qb node Qb, a first terminal of the second carry output transistor Tc2 can be connected to the first terminal of the second carry output transistor Tc2, and a second terminal of the second carry output transistor Tc2 can be connected to a line through which a carry off voltage GVSS1 is supplied. The carry off voltage GVSS1 can be equal to or different from the gate off voltage GVSS2.

The carry signal C having a high level or a low level can be output through the first carry output transistor Tc1 and the second carry output transistor Tc2. The carry signal C output from the $n^{th}$ stage (Stage n), as illustrated in FIG. 6, can be the $4n-3^{th}$ carry signal C(4n−3).

For example, the carry signal C having a high level can be output through the first carry output transistor Tc1, and the carry signal C having a low level can be output through the second carry output transistor Tc2.

Second, the signal controller 210 can perform a function of controlling the signal output unit 220.

That is, the signal controller 210 can be driven by the carry signal C supplied from the previous stage or the next stage, and thus, can supply the Q node Q with a Q node control signal which allows gate pulses to be output and can supply the Qb node Qb with a Qb node control signal which allows gate off signals to be output.

As described above, the signal controller 210 can be configured in one of various structures which are understood by those skilled in the art for configuring the gate driver 200.

Moreover, a feature of the present disclosure may not correspond to the signal controller 210. Therefore, a detailed description of the signal controller 210 illustrated in FIG. 6 is omitted.

A configuration and a function of the signal controller 210 will be briefly described below.

For example, when a start signal Vs is supplied from the controller 400 or the previous stage, the signal controller 210 can supply a first driving voltage GVDD1 to the Q node Q. The start signal Vs supplied from the previous stage can be the carry signal C.

The pull-up transistors Tu1 to Tu4 of the signal output unit 220 can be turned on by the first driving voltage GVDD1, and the first to fourth gate clocks SCCLK1 to SCCLK4 can be input to the turned-on pull-up transistors Tu1 to Tu4.

Four gate pulses can be output as four gate lines GL4$n$−3 to GL4$n$ by the first to fourth gate clocks SCCLK1 to SCCLK4.

When an off signal Vr is received from the previous stage or the next stage after the four gate pulses are output, the pull-up transistors Tu1 to Tu4 can be turned off, and thus, the gate pulses may not be output. The off signal Vr transferred from the previous stage or the next stage can be the carry signal C.

In this situation, the pull-down transistors Tdn1 to Tdn4 can be turned on, and the gate off voltage GVSS2 can be output to the four gate lines GL4$n$−3 to GL4$n$ through the pull-down transistors Tdn1 to Tdn4. The gate off voltage GVSS2 can be the gate off signal.

Another stage, which has received the carry signal C output from the $n^{th}$ stage (Stage n), can sequentially output the gate pulses to other gate lines, and after the gate pulses are output, the gate off signal can be output from the other stage.

When the above-described processes are repeated by all stages, the gate pulse GP can be sequentially supplied to the first to $g^{th}$ gate lines GL1 to GLg.

Third, the sensing selector 230 can store the selection signal in the sensing selection period and can control the signal output unit 220 by using the selection signal in the sensing period.

To this end, as illustrated in FIG. 6, the sensing selector 230 can include a selection signal storage unit 233 (e.g., capacitor C1), a selection signal controller 231 (e.g., transistors T1, T2 and T3), a selection signal transferor 232 (e.g., transistor T4), and a reset unit 234 (e.g., transistors T5 and T6).

First, basis features of elements configuring the sensing selector 230 will be described below.

The selection signal controller 231 can transfer the selection carry signal CS, transferred from the previous stage, to the selection signal transferor 232 based on a first sensing control pulse input thereto in the sensing selection period.

The selection signal transferor 232 can transfer the selection carry signal CS, received through the selection signal controller 231, to the selection signal storage unit 233.

The selection signal storage unit 233 can store the selection carry signal CS.

Particularly, the selection signal storage unit 233 can store the selection carry signal CS as a selection signal. The selection signal storage unit 233 can be a capacitor. A capacitor configuring the selection signal storage unit 233 can be referred to as a selection signal capacitor C1.

The reset unit 234 can transfer the selection signal to the signal output unit 220 in the selection performance period.

Hereinafter, a structure and a function of the selection signal controller 231 will be described.

The selection signal controller 231 can include a first transistor T1. A first terminal of the first transistor T1 can receive the selection carry signal CS, a second terminal of the first transistor T1 can be connected to the selection signal transferor 232, and the sensing control signal LSP can be input to a gate of the first transistor T1.

The selection signal controller 231 can further include a second transistor T2 and a third transistor T3.

A first terminal of the second transistor T2 can be connected to the second terminal of the first transistor T1, a second terminal of the second transistor T2 can be connected to the selection signal transferor 232, and a gate of the second transistor T2 can be connected to the gate of the first transistor T1.

A first terminal of the third transistor T3 can be connected to the second terminal of the first transistor T1, a second terminal of the third transistor T3 can be connected to a first terminal of a selection signal capacitor C1, and a gate of the third transistor T3 can be connected to a second terminal of the selection signal capacitor C1.

In this situation, the first terminal of the selection signal capacitor C1 can be connected to a line through which a first driving voltage GVDD1 is supplied, and the second terminal of the selection signal capacitor C1 can be connected to the selection signal transferor 232.

That is, the selection signal controller 231 can include only the first transistor T1. In this situation, the selection carry signal CS supplied through the first transistor T1 can be stored in the selection signal storage unit 233 through the selection signal transferor 232. The selection carry signal CS stored in the selection signal storage unit 233 can be referred to as a selection signal.

However, in order to enhance a storage capability of the selection signal storage unit 233, the selection signal controller 231 can further include the second transistor T2 and the third transistor T3.

Hereinafter, a structure and a function of the selection signal transferor 232 will be described.

The selection signal transferor 232 can include a fourth transistor T4.

A first terminal of the fourth transistor T4 can be connected to the second terminal of the first transistor T1, a second terminal of the fourth transistor T4 can be connected to the second terminal of the selection signal capacitor C1, and a gate of the fourth transistor T4 can be connected to a line through which a first carry control clock CC is supplied. When the selection signal controller 231 further includes the second transistor T2 and the third transistor T3, the first terminal of the fourth transistor T4 can be connected to the second terminal of the second transistor T2, and the second terminal of the fourth transistor T4 can be connected to the gate of the third transistor T3.

When the first transistor T1, the second transistor T2, and the fourth transistor T4 are turned on, the selection carry signal CS can be transferred to and stored in the selection signal storage unit 233.

However, the selection signal stored in the selection signal storage unit 233 can be discharged by the selection carry signal CS when the first transistor T1, the second transistor T2, and the fourth transistor T4 are turned on. Accordingly, the selection signal can be deleted from the selection signal storage unit 233.

Hereinafter, a structure and a function of the reset unit 234 will be described.

The reset unit 234 can include a fifth transistor T5 and a sixth transistor T6.

A first terminal of the fifth transistor T5 can be connected to a line through which the first driving voltage GVDD1 is supplied, a second terminal of the fifth transistor T5 can be connected to a first terminal of the sixth transistor T6, and a gate of the fifth transistor T5 can be connected to the selection signal storage unit 233 and the selection signal transferor 232. Particularly, the gate of the fifth transistor T5 can be connected to the second terminal of the selection signal capacitor C1.

A first terminal of the sixth transistor T6 can be connected to the second terminal of the fifth transistor T5, a second terminal of the sixth transistor T6 can be connected to the signal output unit 220, and a gate of the sixth transistor T6 can be connected to a line through which the reset signal RESET is input. Particularly, the second terminal of the sixth transistor T6 can be connected to the signal output unit 220 through the Q node Q.

The sixth transistor T6 can be turned on by a reset pulse constituting the reset signal RESET in the sensing period, and thus, the selection signal can be supplied to the signal output unit 220 and the signal output unit 220 can output at least two gate pulses based on the selection signal.

Finally, the sensing selector 230 can include an initialization unit 235. When an initialization voltage VST is input to the initialization unit 235 after the reset pulse is supplied to the reset unit 234, the gate pulses may not be output from the signal output unit 220.

That is, when the initialization voltage VST is input, the initialization unit 235 can transfer the carry off voltage GVSS1 to the Q node Q. The pull-up transistors Tu1 to Tu4 can be turned off by the carry off voltage GVSS1, and thus, the gate pulses may not be output through the pull-up transistors Tu1 to Tu4.

The initialization unit 235, as illustrated in FIG. 6, can include a seventh transistor T7 and an eighth transistor T8.

A first terminal of the seventh transistor T7 can be connected to the Q node Q, a second terminal of the seventh transistor T7 can be connected to a first terminal of the eighth transistor T8, and a gate of the seventh transistor T7 can be connected to a line through which the initialization voltage VST is supplied.

A first terminal of the eighth transistor T8 can be connected to a second terminal of the seventh transistor T7, a second terminal of the eighth transistor T8 can be connected to a line through which the carry off voltage GVSS1 is supplied, and a gate of the eighth transistor T8 can be connected to a gate of the seventh transistor T7.

Hereinafter, an operating method of a light emitting display apparatus according to the present disclosure will be described with reference to FIGS. 1 to 8.

Figure 7:
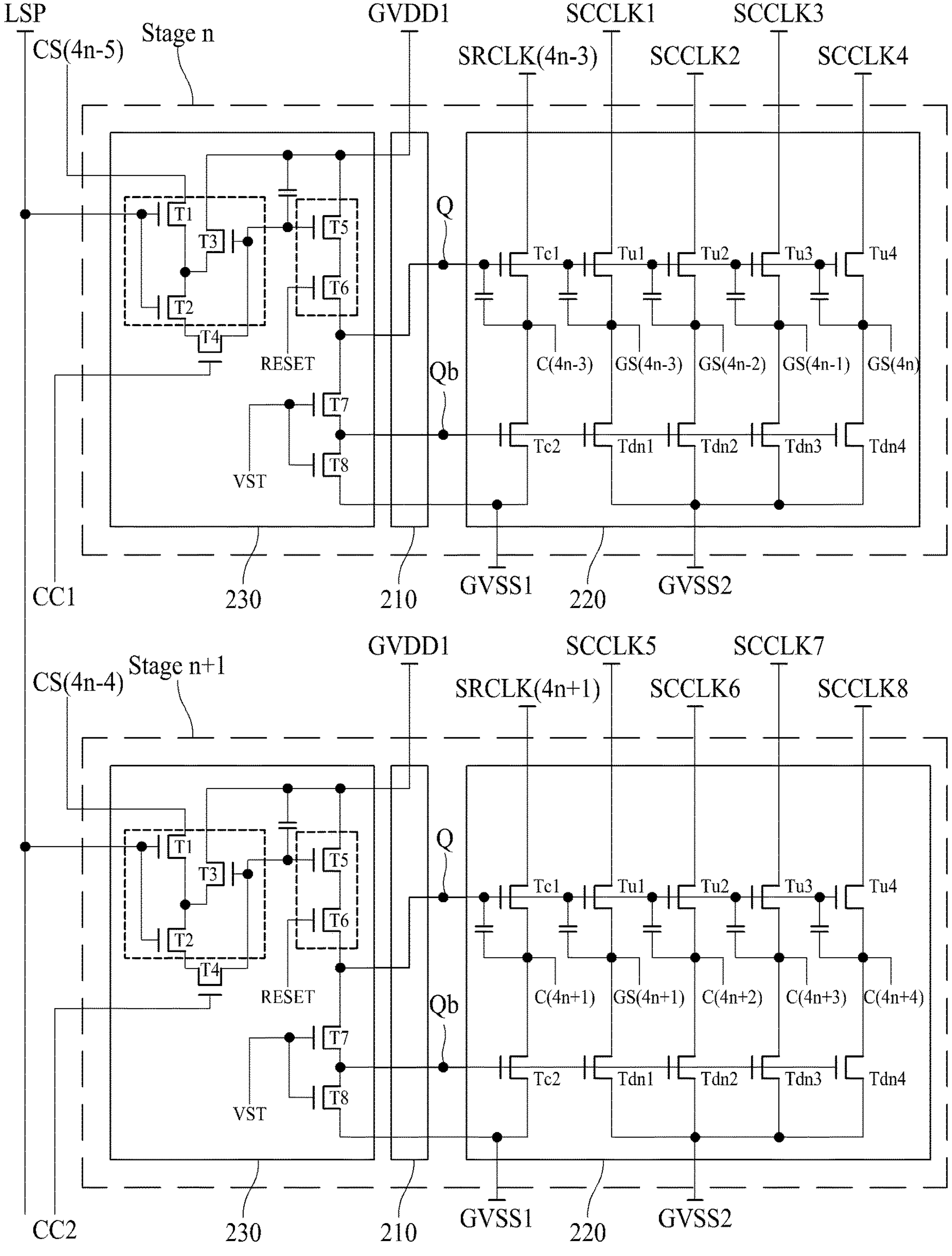
FIG. 7 is an example diagram illustrating two stages in a gate driver applied to a light emitting display apparatus according to an embodiment of the present disclosure.
Figure 8:
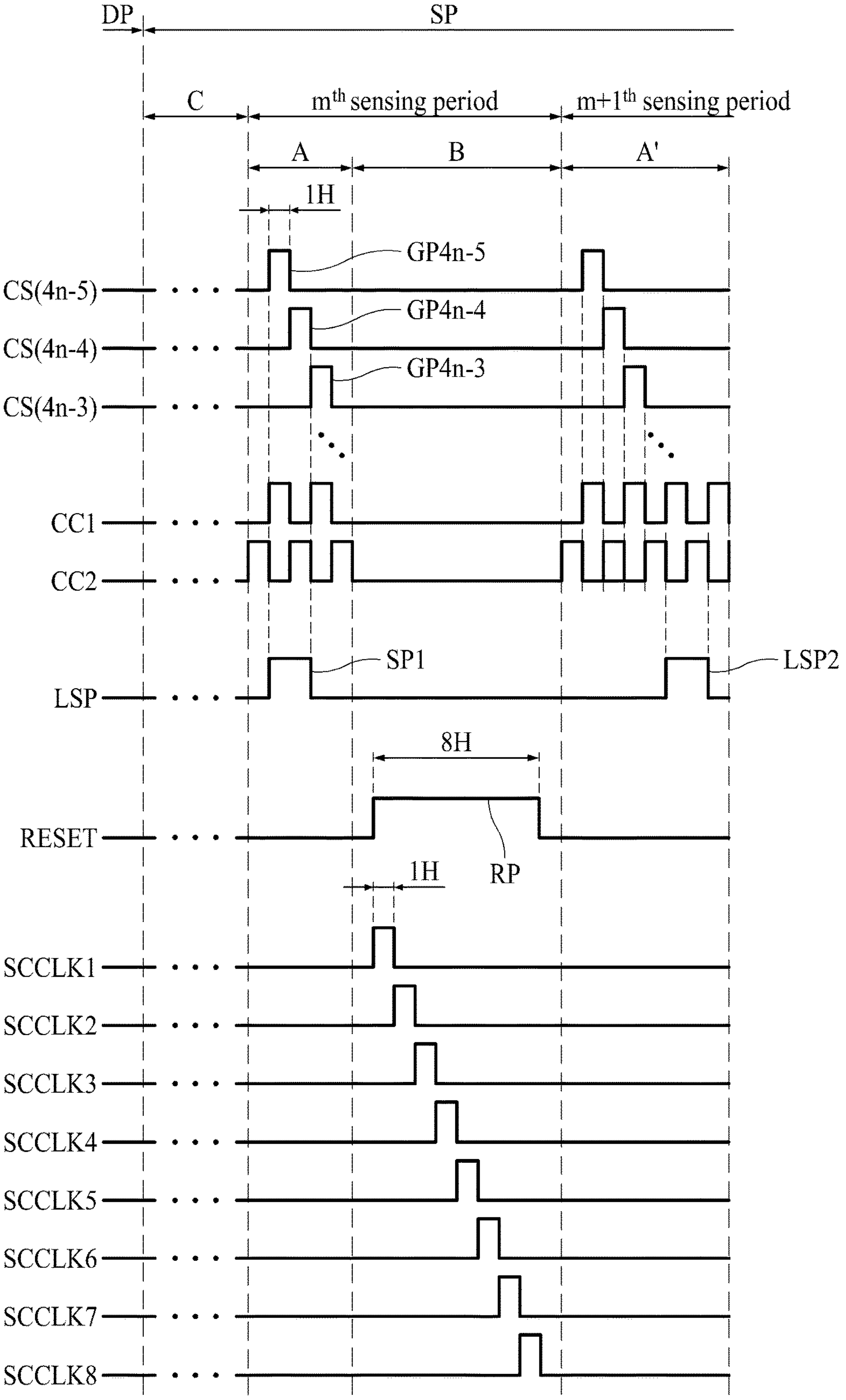
FIG. 8 is an example diagram showing waveforms of signals applied to a light emitting display apparatus according to an embodiment of the present disclosure.

Particularly, FIG. 7 is an example diagram illustrating two stages applied to a light emitting display apparatus according to an embodiment of the present disclosure, and FIG. 8 is an example diagram showing waveforms of signals applied to a light emitting display apparatus according to the present disclosure. In the following description, descriptions which are the same as or similar to descriptions given above with reference to FIGS. 1 to 6 are omitted or will be briefly given.

As described above, one of the purposes of the present disclosure can provide a light emitting display apparatus which can sense pixels connected to at least two gate lines in a sensing period.

Particularly, at least two gate lines can be connected to at least two stages. That is, in the present disclosure, pixels connected to at least two gate lines connected to at least two stages can be sensed in a sensing period.

Hereinafter, a method of sensing pixels connected to eight gate lines connected to two stages in a sensing period will be described. Therefore, the following description can be applied to a method of sensing pixels connected to all gate lines connected to two or more stages, and in this situation, at least two gate lines can be connected to one stage.

In the following description, as illustrated in FIG. 7, two stages can include an $n^{th}$ stage (Stage n) and an $n+1^{th}$ stage (Stage n+1).

Each of the $n^{th}$ stage (Stage n) and the $n+1^{th}$ stage (Stage n+1) can include the same elements as those of the $n^{th}$ stage (Stage n) described above with reference to FIG. 6. In this situation, as described above, a structure of the signal controller 210 can be modified in various types. Therefore, in FIG. 7, a detailed structure of the signal controller 210 configuring the $n^{th}$ stage (Stage n) and the $n+1^{th}$ stage (Stage n+1) is not illustrated. However, a detailed example of the signal controller 210 is shown in FIG. 6. Hereinafter, therefore, a detailed description of the signal controller 210 is omitted.

Internal configurations of the $n^{th}$ stage (Stage n) and the $n+1^{th}$ stage (Stage n+1) can be the same. Also, a first driving voltage GVDD1, a gate off voltage GVSS2, a carry off voltage GVSS1, and a sensing control signal LSP input to the $n^{th}$ stage (Stage n) can be the same as a first driving voltage GVDD1, a gate off voltage GVSS2, a carry off voltage GVSS1, and a sensing control signal LSP input to the $n+1^{th}$ stage (Stage n+1). In this situation, the sensing control signal LSP can be transferred from the controller 400. That is, the sensing control signal LSP can be included in the gate control signals GCS.

However, a selection carry signal CS input to the $n^{th}$ stage (Stage n) can be a signal which differs from a selection carry signal CS input to the $n+1^{th}$ stage (Stage n+1). Also, a phase of a first selection carry signal CS1 input to the $n^{th}$ stage (Stage n) can be opposite to that of a second selection carry signal CS2 input to the $n+1^{th}$ stage (Stage n+1).

Hereinafter, a light emitting display apparatus where the selection carry signal CS input to the $n^{th}$ stage (Stage n) is a $4n-5^{th}$ gate signal output to a $4n-5^{th}$ gate line and the selection carry signal CS input to the $n+1^{th}$ stage (Stage n+1) is a $4n-4^{th}$ gate signal output to a $4n-4^{th}$ gate line will be described as an example of the present disclosure.

That is, the selection carry signal CS can be one of carry signals C output through a first carry transistor Tc1 and a second carry transistor Tc2 included in a previous stage or a next stage, or can be one of gate signals GS output to gate lines connected to the previous stage or the next stage.

To provide an additional description, the selection carry signals CS input to the $n^{th}$ stage (Stage n) and the $n+1^{th}$ stage (Stage n+1) can be selected from among various signals (for example, the gate signals GS and the carry signals C) generated by the previous stage or the next stage.

Hereinafter, the $4n-5^{th}$ gate signal output to the $4n-5^{th}$ gate line can be referred to as a $4n-5^{th}$ selection carry signal CS(4n−5), and the $4n-4^{th}$ gate signal output to the $4n-4^{th}$ gate line can be referred to as a $4n-4^{th}$ selection carry signal CS(4n−4). Therefore, as illustrated in FIG. 8, a $4n-5^{th}$ gate pulse GP4*n*−5 can be included in the $4n-5^{th}$ selection carry signal CS(4n−5), and a $4n-4^{th}$ gate pulse GP4*n*−4 can be included in the $4n-4^{th}$ selection carry signal CS(4n−4).

A $4n-3^{th}$ gate pulse GP4*n*−3 output to a $4n-3^{th}$ gate line connected to the $n^{th}$ stage (Stage n) can also be used as a selection carry signal CS of another stage. Therefore, in FIG. 8, a gate signal GS including the $4n-3^{th}$ gate pulse GP4*n*−3 output to the $4n-3^{th}$ gate line is illustrated as a $4n-3^{th}$ selection carry signal CS(4n−3).

That is, the $4n-5^{th}$ selection carry signal CS(4n−5), the $4n-4^{th}$ selection carry signal CS(4n−4), and the $4n-3^{th}$ selection carry signal CS(4n−3) can be signals which are sequentially generated as illustrated in FIG. 8.

Moreover, first to fourth gate clocks SCCLK1 to SCCLK4 input to the $n^{th}$ stage (Stage n) can be signals which differ from fifth to eighth gate clocks SCCLK5 to SCCLK8 input to the $n+1^{th}$ stage (Stage n+1). That is, as illustrated in FIG. 8, the first to fourth gate clocks SCCLK1 to SCCLK4 and the fifth to eighth gate clocks SCCLK5 to SCCLK8 can be different signals having different phases.

In this situation, the first to fourth gate clocks SCCLK1 to SCCLK4 can be supplied to the $n^{th}$ stage (Stage n), and then, the fifth to eighth gate clocks SCCLK5 to SCCLK8 can be input to the n+1$^{th}$ stage (Stage n+1).

Gate pulses can be sequentially output to the 4n−3$^{th}$ to 4n+4$^{th}$ gate lines GL4*n*−3 to GL4*n*+4 by the first to fourth gate clocks SCCLK1 to SCCLK4 and the fifth to eighth gate clocks SCCLK5 to SCCLK8.

First, when a display period DP starts after the light emitting display apparatus is turned on, the controller 400, the gate driver 200, and the data driver 300 can be driven, and thus, the light emitting display panel 100 can display an image.

Subsequently, when a user powers off the light emitting display apparatus or an electronic device while executing the display period DP, the display period DP can end, and a sensing period SP can start.

That is, in executing the display period DP where an image is displayed, when a user powers off an electronic device (e.g., by pressing the power button on the electronic device or on a remote), the light emitting display apparatus can stop an operation of displaying an image and can perform a sensing operation. Here, a period where the sensing operation is performed can be a sensing period SP.

Subsequently, when the display period ends, the sensing period can start. Alternatively, the sensing period can be carried out at start up (during a power ON sequence) before a first display frame is displayed or during active driving of the display in a blank period or between display frames.

In the following description, the sensing period can include a sensing selection period A and a pixel sensing period B.

Moreover, in the following description, the sensing period can be carried out as a sequence of periods (e.g., a series of selection periods A and pixel sensing periods B).

That is, one sensing period which is performed first after the sensing period SP starts can be referred to as a first sensing period, and another sensing period which is performed second can be referred to as a second sensing period.

After the first sensing period, second to m−1$^{th}$ sensing periods can be repeated, and when the m−1$^{th}$ sensing period ends, the m$^{th}$ period can start (where m is a natural number which is less than g).

The same type of operations can be performed in each of the first to m$^{th}$ periods. Hereinafter, therefore, the m$^{th}$ period will be described as an example of the present disclosure. That is, a sensing operation can be performed on pixels connected to the n$^{th}$ stage (Stage n) and the n+1$^{th}$ stage (Stage n+1) in the m$^{th}$ period. In FIG. 8, the first to m$^{th}$−1 periods are illustrated by C.

Subsequently, when the m$^{th}$ period starts, the sensing selection period A can start.

When the sensing selection period A starts, a signal controller 210 of a first stage (Stage 1) can be driven and can sequentially output gate pulses to first to fourth gate lines GL1 to GL4. In this situation, a data driver 300 can output data voltages Vdata, representing black, to data lines DL1 to DLd. Accordingly, the light emitting display apparatus can display a blank image or black screen. Therefore, a user can recognize that the light emitting display apparatus is turned off, even though a sensing operation is being performed.

Subsequently, a second stage (Stage 2) can be driven and can sequentially output gate pulses to fifth to eighth gate lines.

Such an operation can be repeated up to the n−1$^{th}$ stage. The n−1$^{th}$ stage can output 4n−7$^{th}$ to 4n−4$^{th}$ gate pulses, and then, the n$^{th}$ stage (Stage n) can be driven.

In this situation, as described above, a 4n−5$^{th}$ gate pulse GP4*n*−5 output to a 4n−5$^{th}$ gate line can be input as a selection carry signal CS of the n$^{th}$ stage (Stage n). That is, a 4n−5$^{th}$ selection carry signal CS(4n−5) can be input to a selection signal controller 231 of the n$^{th}$ stage (Stage n).

At a timing at which the 4n−5$^{th}$ selection carry signal CS(4n−5) is input to the selection signal controller 231 of the n$^{th}$ stage (Stage n), the controller 400 can supply the n$^{th}$ stage (Stage n) with a first sensing control pulse SP1 and a first carry control clock CC1 having a high level. The first sensing control pulse SP1 and the first carry control clock CC1 can be included in the gate control signals GCS.

That is, information about the sensing performed on pixels connected to the n$^{th}$ stage (Stage n) and the n+1$^{th}$ stage (Stage n+1) in the m$^{th}$ period can be stored in the controller 400, or information about a sensing control signal LSP including a first sensing control pulse SP1 set based on the timing can be stored in the controller 400.

At the timing at which the 4n−5$^{th}$ selection carry signal CS(4n−5) is input to the selection signal controller 231 of the n$^{th}$ stage (Stage n), when the sensing control pulse SP1 is supplied to the n$^{th}$ stage (Stage n), a first transistor T1 and a second transistor T2 of the selection signal controller 231 can be turned on by the first sensing control pulse SP1 having a high level.

In this situation, a fourth transistor T4 of the selection signal transferor 232 can also be turned on by the first carry control clock CC1 having a high level.

When the first transistor T1, the second transistor T2, and the fourth transistor T4 of the n$^{th}$ stage (Stage n) are turned on, the 4n−5$^{th}$ selection carry signal CS(4n−5) can be stored in a selection signal storage unit 233 (e.g., capacitor C1) of the n$^{th}$ stage (Stage n) through the first transistor T1, the second transistor T2, and the fourth transistor T4.

In this situation, the 4n−5$^{th}$ selection carry signal CS(4n−5) having a high level can be a selection signal.

Subsequently, a 4n−4$^{th}$ gate pulse GP4*n*−5 output to a 4n−4$^{th}$ gate line can be input as a selection carry signal CS of the n+1$^{th}$ stage (Stage n+1). That is, a 4n−4$^{th}$ selection carry signal CS(4n−4) can be input to a selection signal controller 231 of the n+1$^{th}$ stage (Stage n+1).

At a timing at which the 4n−4$^{th}$ selection carry signal CS(4n−4) is input to the selection signal controller 231 of the n+1$^{th}$ stage (Stage n+1), the controller 400 can supply the n+1$^{th}$ stage (Stage n+1) with the first sensing control pulse SP1 and a second carry control clock CC2 having a high level. That is, the first sensing control pulse SP1 supplied to the n$^{th}$ stage (Stage n) can be supplied to the n+1$^{th}$ stage (Stage n+1).

To this end, a pulse width of the first sensing control pulse SP1 can be set to be equal to or greater than that of each of the 4n−5$^{th}$ selection carry signal CS(4n−5) and the 4n−4$^{th}$ selection carry signal CS(4n−4). Also, the first carry control clock CC1 and the second carry control clock CC2 can be clocks which alternately have a high level, and a width of each of the first carry control clock CC1 and the second carry control clock CC2 can be set to have a size which is equal to a pulse width of each of the 4n−5$^{th}$ selection carry signal CS(4n−5) and the 4n−4$^{th}$ selection carry signal CS(4n−4).

At the timing at which the 4n−4$^{th}$ selection carry signal CS(4n−4) is input to the selection signal controller 231 of the n+1$^{th}$ stage (Stage n+1), when the sensing control pulse SP1 is supplied to the n+1$^{th}$ stage (Stage n+1), a first transistor T1 and a second transistor T2 of the selection signal controller 231 can be turned on by the first sensing control pulse SP1 having a high level.

In this situation, a fourth transistor T4 of the selection signal transferor 232 of the n+1$^{th}$ stage (Stage n+1) can also be turned on by the second carry control clock CC2 having a high level.

When the first transistor T1, the second transistor T2, and the fourth transistor T4 of the n+1$^{th}$ stage (Stage n+1) are turned on, the 4n−4$^{th}$ selection carry signal CS(4n−4) can be stored in a selection signal storage unit 233 of the n+1$^{th}$ stage (Stage n+1) through the first transistor T1, the second transistor T2, and the fourth transistor T4 of the n+1$^{th}$ stage (Stage n+1).

In this situation, the 4n−4$^{th}$ selection carry signal CS(4n−4) having a high level can be a selection signal.

Through the above-described processes, in the sensing selection period A, the 4n−5$^{th}$ selection carry signal CS(4n−5) having a high level can be stored in the selection signal storage unit 233 of the n$^{th}$ stage (Stage n), and the 4n−4$^{th}$ selection carry signal CS(4n−4) having a high level can be stored in the selection signal storage unit 233 of the n+1$^{th}$ stage (Stage n+1).

Subsequently, the other stages can be sequentially driven, and thus, the gate pulses can be sequentially output to the other gate lines.

In this situation, the sensing control signal LSP having a high level may not be supplied to the stages.

That is, the sensing control signal LSP having a high level (e.g., the first sensing control pulse SP1) can be supplied to the stages at only a timing, at which a selection signal is stored, of the sensing selection period A. At a timing at which the first sensing control pulse SP1 is supplied, a selection carry signal having a high level (e.g., only the 4n−5$^{th}$ selection carry signal CS(4n−5) and the 4n−4$^{th}$ selection carry signal CS(4n−4)) can be stored as a selection signal in the selection signal storage unit 233 of each of the n$^{th}$ stage (Stage n) and the n+1$^{th}$ stage (Stage n+1).

Subsequently, when the sensing selection period A for sensing the pixels connected to a group of gate lines ends, the sensing period B for sensing the pixels connected to another group of gate lines can start.

When the sensing period B starts, the controller 400 can supply the stages with the reset signal RESET having a high level (e.g., a reset pulse RP).

The reset pulse RP, as illustrated in FIG. 8, can have a pulse width of 8 H. Here, 1 H can be a pulse width of the selection carry signal CS. That is, a pulse width of the reset pulse RP can have a size which is at least eight times a pulse width of the selection carry signal CS. In this situation, a pulse width of the first sensing control pulse SP1 can be 2H. For example, a pulse width of the reset pulse RP can be greater than a pulse width of sensing control pulse SP, and the pulse width of sensing control pulse SP can be greater than a pulse width of the selection carry signal CS (e.g., pulse width of RP>pulse width of SP>pulse width of CS).

When the reset pulse RP is supplied to the n$^{th}$ stage (Stage n) and the n+1$^{th}$ stage (Stage n+1), the sixth transistor T6 included in the reset unit 234 of each of the n$^{th}$ stage (Stage n) and the n+1$^{th}$ stage (Stage n+1) can be turned on, and thus, the first driving voltage GVDD1 having a high level can be applied to the Q node.

That is, because the fifth transistor T5 is turned on by the selection signal and the sixth transistor T6 is turned on by the reset pulse RP, the first driving voltage GVDD1 can be applied to the Q node through the fifth transistor T5 and the sixth transistor T6.

Therefore, the first to fourth pull-up transistors Tu1 to Tu4 included in each of the n$^{th}$ stage (Stage n) and the n+1$^{th}$ stage (Stage n+1) can be turned on.

Subsequently, when the first to fourth pull-up transistors Tu1 to Tu4 included in each of the n$^{th}$ stage (Stage n) and the n+1$^{th}$ stage (Stage n+1) are turned on during 8H where the first driving voltage GVDD1 is applied to the Q node, the 4n−3$^{th}$ to 4n+4$^{th}$ gate pulses can be sequentially supplied to the 4n−3$^{th}$ to 4n+4$^{th}$ gate lines GL4*n*−3 to GL4*n*+4 based on the first to eighth gate clocks SCCLK1 to SCCLK8 during 8H.

Subsequently, when the 4n−3$^{th}$ to 4n+4$^{th}$ gate pulses are supplied to the 4n−3$^{th}$ to 4n+4$^{th}$ gate lines GL4*n*−3 to GL4*n*+4, a corresponding switching transistor Tsw1 connected to each gate line, among the 4n−3$^{th}$ to 4n+4$^{th}$ gate lines GL4*n*−3 to GL4*n*+4, can be turned on, and thus, a data voltage can be supplied to a corresponding driving transistor Tdr.

In this situation, when the sensing transistor Tsw2 is turned on by a sensing control signal SS, pieces of information associated with a characteristic of the driving transistor Tdr or a characteristic of a light emitting device ED can be transferred to the data driver 300 through the sensing transistor Tsw2 and a sensing line SL.

The data driver 300 can convert a sensing signal, received through the sensing line SL, into digital sensing data and can transfer the sensing data to the controller 400.

The controller can calculate a variation amount of a threshold voltage of the driving transistor Tdr, a variation amount of mobility of the driving transistor Tdr, a variation amount of a current flowing in the light emitting device ED, or a variation amount of a voltage applied to the light emitting device ED by using the sensing data.

That is, in the sensing period B, as described above, a sensing operation can be performed on pixels connected to the 4n−3$^{th}$ to 4n+4$^{th}$ gate lines GL4*n*−3 to GL4*n*+4 connected to the n$^{th}$ stage (Stage n) and the n+1$^{th}$ stage (Stage n+1) (e.g., the pixels connected to eight different gate lines can be sensed in the sensing period B).

Subsequently, when the sensing period B ends, a sensing selection period A' of an m+1$^{th}$ sensing period can start, and then the pixels connected to a different group of eight different gate lines can be sensed, and the process can be repeated until all the pixels are sensed during a power OFF sensing sequence. Alternatively, the sensing can be carried out during a power On sensing sequence, or between display frames as real-time sensing.

In this situation, as described in association with a sensing selection period A of an m$^{th}$ period, the n$^{th}$ to n−1$^{th}$ stage can be sequentially driven, and thus, the gate pulses can be sequentially output to the gate lines.

At a timing at which the 4n−5$^{th}$ selection carry signal CS(4n−5) and the 4n−4$^{th}$ selection carry signal CS(4n−4) having a high level are input to the n$^{th}$ stage (Stage n) and the n+1$^{th}$ stage (Stage n+1), the selection control signal LSP having a high level may not be supplied.

Accordingly, the selection signal may not be supplied to the n$^{th}$ stage (Stage n) and the n+1$^{th}$ stage (Stage n+1). However, a selection signal stored in the m$^{th}$ period can still be stored in the n$^{th}$ stage (Stage n) and the n+1$^{th}$ stage (Stage n+1).

Subsequently, as illustrated in FIG. 8, in a sensing selection period A' of the m+1$^{th}$ period, the selection control signal LSP having a high level (e.g., the second sensing control pulse SP2) can be supplied to all stages.

In this situation, selection carry signals CS having a high level can be supplied to two stages which are to be sensed in a sensing period of the m+1$^{th}$ period, and thus, selection signals can be stored in two stages.

However, as illustrated in FIG. 8, when the second sensing control pulse SP2 is supplied to the $n^{th}$ stage (Stage n) and the $n+1^{th}$ stage (Stage n+1), the $4n-5^{th}$ selection carry signal CS(4n−5) and the $4n-4^{th}$ selection carry signal CS(4n−4) having a low level can be supplied to $n^{th}$ stage (Stage n) and the $n+1^{th}$ stage (Stage n+1), and the first carry control clock CC1 having a high level and the second carry control clock CC2 having a high level can be sequentially supplied to $n^{th}$ stage (Stage n) and the $n+1^{th}$ stage (Stage n+1).

Therefore, a first transistor T1 and a second transistor T2 of the $n^{th}$ stage (Stage n) can be turned on by the second sensing control pulse SP2 and a fourth transistor T4 can be turned on by the first carry control clock CC1 having a high level, and thus, a low level can be supplied to a first terminal of the first transistor T1 of the $n^{th}$ stage (Stage n).

Moreover, a first transistor T1 and a second transistor T2 of the $n+1^{th}$ stage (Stage n+1) can be turned on by the second sensing control pulse SP2 and a fourth transistor T4 can be turned on by the second carry control clock CC2 having a high level, and thus, a low level can be supplied to a first terminal of the first transistor T1 of the $n+1^{th}$ stage (Stage n+1).

Therefore, the selection signal having a high level stored in a selection signal capacitor C1 of the selection signal storage unit 233 of each of the $n^{th}$ stage (Stage n) and the $n+1^{th}$ stage (Stage n+1) can be discharged to a first terminal of the first transistor T1 through the fourth transistor T4, the second transistor T2, and the first transistor T1.

Accordingly, the selection signal may not be stored in the $n^{th}$ stage (Stage n) and the $n+1^{th}$ stage (Stage n+1) any longer, and the selection signal can be cleared from these two stages.

That is, through the above-described processes, during the sensing selection period A' of the $m+1^{th}$ period, selection signals can be stored in two stages which are to be sensed in the sensing period of the $m+1^{th}$ period, and the selection signal stored in the $n^{th}$ stage (Stage n) and the $n+1^{th}$ stage (Stage n+1) can be discharged (e.g., deleted or cleared).

Subsequently, an operation such as an operation performed in the sensing period of the $m^{th}$ period can be performed in the sensing period of the $m+1^{th}$ period. Particularly, in the sensing period of the $m+1^{th}$ period, sensing of pixels connected to stages storing a selection signal can be performed during the sensing selection period A' of the $m+1^{th}$ period.

Subsequently, processes described above can be repeatedly performed up to a last stage.

Accordingly, pixels connected to all stages can be sensed, and the entire display panel can be sensed when the power off signal is received from a user.

Finally, when the sensing of all stages has completed, the light emitting display apparatus can be fully turned off. In this situation, sensing data of all driving transistors sensed through the processes can be stored in the controller 400.

When the light emitting display apparatus is turned on again, the controller 400 can correct variations of threshold voltages of driving transistors Tdr in the display period DP by using the sensing data stored in the storage unit 450.

According to one or more embodiments of the present disclosure described above, pixels connected to at least two stages can be sensed in one sub-portion of a sensing period.

Accordingly, according to one or more embodiments of the present disclosure, a time period where all pixels are sensed can be reduced compared to the light emitting display apparatus of the related art.

To provide an additional description, when the $n^{th}$ stage (Stage n) and the $n+1^{th}$ stage (Stage n+1) of all stages are driven in the sensing selection period A, the controller can supply the first sensing control pulse SP1 to the $n^{th}$ stage (Stage n) and the $n+1^{th}$ stage (Stage n+1).

In this situation, a selection signal can be stored in an $n^{th}$ sensing selector included in the $n^{th}$ stage which has received the first sensing control pulse SP1 and an $n+1^{th}$ sensing selector included in the $n+1^{th}$ stage which has received the first sensing control pulse SP1.

Two stages (Stage n and Stage n+1) storing the selection signal can sequentially supply gate pulses to gate lines connected to two stages.

That is, when the reset pulse RP is received by the $n^{th}$ stage (Stage n) and the $n+1^{th}$ stage (Stage n+1) in the sensing period B, the $n^{th}$ stage (Stage n) and the $n+1^{th}$ stage (Stage n+1) can sequentially output the gate pulses to gate lines connected to the $n^{th}$ stage (Stage n) and the $n+1^{th}$ stage (Stage n+1).

Accordingly, sensing can be performed on pixels connected to two stages.

The selection signals stored in the $n^{th}$ sensing selector and the $n+1^{th}$ sensing selector can be discharged and deleted when another sensing selection period A' starts after the sensing period B and the second sensing control pulse SP2 is supplied to stages.

A sensing operation of sensing threshold voltages of driving transistors can be performed before a display period starts after a light emitting display apparatus is turned on, or can be performed before the light emitting display apparatus is turned off after the display period ends.

According to one or more embodiments of the present disclosure, threshold voltages of driving transistors corresponding to at least two gate lines can be sensed in one period. Accordingly, threshold voltages of all driving transistors included in the light emitting display apparatus can be quickly sensed. For example, pixels connected to two more gate lines can be sensed during the same period, instead of only sensing pixels connected to one gate line during one period.

Therefore, a period until the display period starts after the light emitting display apparatus is turned on can be shortened, and thus, a user can earlier check an image than the related art. For example, according to embodiments of the present disclosure, the light emitting display apparatus can be repeatedly turned off and turned back on much faster than the related art. For example, when the light emitting display apparatus of the related art is turned off by a user, and then the user tries to quickly turn the light emitting display apparatus back on, a long lag time may be experienced by the user (e.g., where it may appear as if nothing is happening as a bank screen is presented to the user), since pixels are sensed one gate line at a time when being powered down, which can lead to much frustration.

Moreover, a period until the light emitting display apparatus is turned off after the display period ends can be shortened, and thus, power consumption of the light emitting display apparatus can be reduced. Accordingly, the light emitting display apparatus can improve the user experience while also saving power.

The above-described features, structure, and effects of the present disclosure are included in at least one embodiment of the present disclosure, but are not limited to only one embodiment. Furthermore, the features, structure, and effects described in at least one embodiment of the present disclosure can be implemented through combination or modification of other embodiments by those skilled in the art. Therefore, content associated with the combination and modification should be construed as being within the scope of the present disclosure.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A light emitting display device, comprising:

a display panel including a plurality of pixels;

a plurality of gate lines configured to supply gate signals to the pixels; and a plurality of stages connected to the plurality of gate lines, and configured to output gate pulses to a group of pixels connected to at least two gate lines among the plurality of gate lines for sensing a characteristic of each pixel among the group of pixels during a sensing period, wherein each of the plurality of stages includes:

a sensing selector configured to store a selection signal in a sensing selection period of the sensing period, and control the signal output unit to output the gate pulses during a sensing performance period of the sensing period based on the selection signal, the sensing performance period being subsequent to the sensing selection period, and wherein the sensing selector in each of the plurality of stages includes:

a selection signal transferor including a fourth transistor configured to transfer a carry signal from a carry output, the carry signal being received through the selection signal controller based on a carry control clock signal applied to a gate of the fourth transistor.

2. The light emitting display device claim 1, wherein sensing period is initiated after receiving a power OFF command for powering down the light emitting display device.

3. The light emitting display device of claim 1, wherein a first stage among the plurality of stages is configured to output the gate pulses to a first block of pixels connected to a first set of four or more gate lines for sensing a characteristic of each pixel in the first block of pixels during a first period of the sensing period, and wherein a second stage among the plurality of stages is configured to output the gate pulses to a second block of pixels connected to a second set of four or more gate lines for sensing a characteristic of each pixel in the second block of pixels during a second period of the sensing period subsequent to the first period.

4. The light emitting display device of claim 1, wherein the plurality of stages include:

a first stage connected to a first gate line and a second gate line for supplying gate signals to a first group of pixels connected to the first gate line and the second gate line; and a second stage connected to a third gate line and a fourth gate line for supplying gate signals to a second group of pixels connected to the third gate line and the fourth gate line, wherein the first stage is configured to output gate pulses to the first gate line and the second gate line for sensing a characteristic of each pixel among the first group of pixels during the sensing period, and wherein the second stage is configured to output gate pulses to the third gate line and the fourth gate line for sensing a characteristic of each pixel among the second group of pixels during the sensing period.

5. The light emitting display device of claim 4, wherein the plurality of stages include:

a third stage connected to a fifth gate line and a sixth gate line for supplying gate signals to a third group of pixels connected to the fifth gate line and the sixth gate line, wherein the third stage is configured to output gate pulses to the fifth gate line and the sixth gate line for sensing a characteristic of each pixel among the third group of pixels during the sensing period.

6. The light emitting display device of claim 1, wherein the at least two gate lines are connected to a same stage among the plurality of stages.

7. The light emitting display device of claim 1, wherein the at least two gate lines are connected to at least two different stages among the plurality of stages.

8. The light emitting display device of claim 1, wherein each of the plurality of stages further includes:

a signal output unit configured to sequentially output the gate pulses to the at least two gate lines.

9. The light emitting display device of claim 8, wherein the sensing selector includes a capacitor for storing the selection signal.

10. The light emitting display device of claim 8, wherein the selection signal is stored in the sensing selectors included in at least two stages among the plurality of stages in the sensing selection period of the sensing period.

11. The light emitting display device of claim 8, wherein the sensing selector is configured to:

in response to receiving a first sensing control pulse during the sensing selection period of the first frame period while the selection signal is stored in the sensing selector, control the signal output unit to sequentially output the gate pulses to the at least two gate lines while a reset signal is received by the sensing selector during the sensing performance period of the sensing period.

12. A light emitting display device, comprising:

a display panel including a plurality of pixels;

a plurality of gate lines configured to supply gate signals to the pixels; and a plurality of stages connected to the plurality of gate lines, and configured to output gate pulses to a group of pixels connected to at least two gate lines among the plurality of gate lines for sensing a characteristic of each pixel among the group of pixels during a sensing period, wherein each of the plurality of stages includes:

a signal output unit configured to sequentially output the gate pulses to the at least two gate lines; and a sensing selector configured to store a selection signal in a sensing selection period of the sensing period, and control the signal output unit to output the gate pulses during a sensing performance period of the sensing period based on the selection signal, the sensing performance period being subsequent to the sensing selection period, wherein the sensing selector is configured to:

in response to receiving a first sensing control pulse during the sensing selection period of the first frame period while the selection signal is stored in the sensing selector, control the signal output unit to sequentially output the gate pulses to the at least two gate lines while a reset signal is received by the sensing selector during the sensing performance period of the sensing period, and wherein a width of the reset signal is greater than a width of the first sensing control pulse, and the width of the first sensing control pulse is greater than a width of the selection signal.

13. The light emitting display device of claim 8, wherein the sensing selector of an $n^{th}$ stage, among the plurality of stages, is configured to receive a carry signal supplied from another stage among plurality of stages as the selection signal of the $n^{th}$ stage, n being a positive integer greater than zero.

14. The light emitting display device of claim 13, wherein an $n+1^{th}$ stage, among the plurality of stages, is configured to receive a different carry signal supplied from a different stage among plurality of stages as the selection signal of the $n+1^{th}$ stage, the different stage being different than the another stage.

15. The light emitting display device of claim 13, wherein the sensing selector in each of the plurality of stages further includes:

a reset unit including:

a fifth transistor having a gate connected to a gate of the third transistor of the selection signal controller, and a sixth transistor having a first terminal connected to the fifth transistor, a gate configured to be supplied with a reset signal, and a second terminal connected to a Q node of the corresponding stage.

16. The light emitting display device of claim 15, wherein the sensing selector in each of the plurality of stages further includes:

a selection signal storage unit connected between the selection signal controller and the reset unit, the selection signal storage unit including a capacitor.

17. The light emitting display device of claim 15, wherein the sensing selector in each of the plurality of stages further includes:

an initialization unit including:

a seventh transistor including a first terminal connected to the sixth transistor, and a second terminal connected to a Qb node of the corresponding stage; and an eight transistor including a first terminal connected to the second terminal of the seventh transistor, wherein a gate of the seventh transistor is connected to a gate of the sixth transistor and configured to be supplied with an initialization voltage.

18. The light emitting display device of claim 17, wherein the initialization unit is configured to:

in response to receiving the initialization voltage, prevent the signal output unit from outputting the gate pulses to the at least two gate lines.

19. The light emitting display device of claim 8, wherein the sensing selector in each of the plurality of stages includes:

a selection signal controller including:

a first transistor including a first terminal connected to a carry output of another stage among the plurality of stages;

a second transistor including a first terminal connected to a second terminal of the first transistor; and a third transistor connected between the second terminal of the first transistor and the first terminal of the second transistor, wherein a first gate of the first transistor is connected to a second gate of the second transistor, and the first and second gates are connected to a sensing control signal line configured to be supplied with the first sensing control pulse.

20. The light emitting display device of claim 19, wherein the first and second gates in the selection signal controller of an $n^{th}$ stage, among the plurality of stages, and the first and second gates in the selection signal controller of an $n+1^{th}$ stage, among the plurality of stages, are all connected to the sensing control signal line, n being a positive integer greater than zero.

21. The light emitting display device of claim 20, wherein the first terminal of the first transistor in the selection signal controller of the $n^{th}$ stage and the first terminal of the first transistor in the selection signal controller of the $n+1^{th}$ stage are connected to carry outputs from two different stages among the plurality of stages.

* * * * *